Aug. 8, 1950 J. KOLLMAN 2,517,682
BAKE PAN COVER
Filed Oct. 12, 1946

INVENTOR.
JACK KOLLMAN
BY

Patented Aug. 8, 1950

2,517,682

UNITED STATES PATENT OFFICE 2,517,682

BAKE PAN COVER

Jack Kollman, Chicago, Ill., assignor to Ekco Products Company, Chicago, Ill., a corporation of Illinois Application October 12, 1946, Serial No. 703,026

2 Claims. (Cl. 220—24)

This invention relates to covers for use with baking pans, usually a multiple number of pans arranged in fixed spaced apart assembly, and particularly designed for baking bread loaves of substantially rectangular cross section contour. In a cover for this purpose it is customary to employ a relatively heavy metal band or strap arranged in the form of a loop conforming with and adapted to fit loosely about the upper periphery of the pan unit, which band or strap is crimped or wrapped within a downwardly and inwardly bent flange of a sheet metal cover whereby the cover is so weighted as to restrict expansion of the pan contents by direct contact thereof with the inside of the cover.

Due to relatively severe handling and usage of equipment of this kind, usually encountered in commercial bakery operations, the band or strap enclosed by the flange of the cover is loosened with the result that the cover is caused to go out of shape and finally becomes unserviceable for lack of fit with the top of the pan set.

The present invention has for its object the provision of improved means for securing the heavy metal band to the flanges of the cover in such a manner that the strap will be held in fixed position even under conditions of severe handling.

With the above and other objects in view, as will be apparent, this invention consists in the construction, combination and arrangement of parts, all as hereinafter more fully described, claimed and illustrated in the accompanying drawings, wherein:

Figure 1:
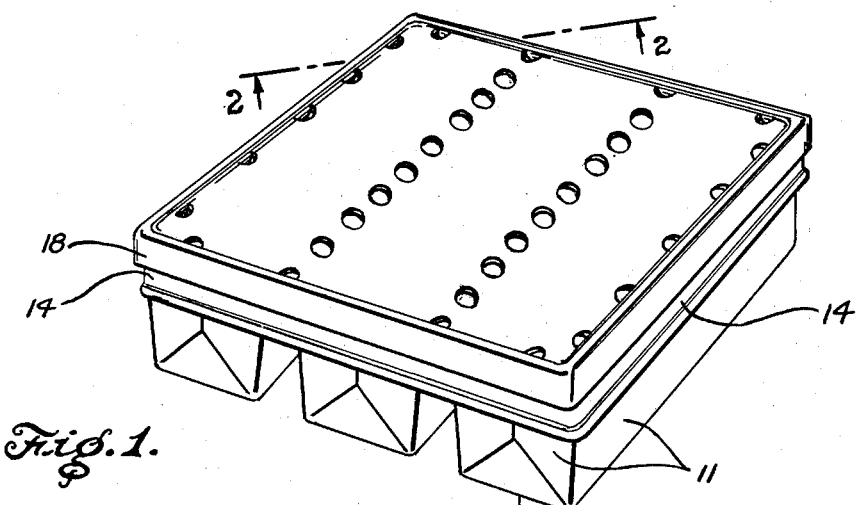
Fig. 1 is a top perspective view of a bake pan set equipped with a cover in accordance with the present invention.
Figure 2:
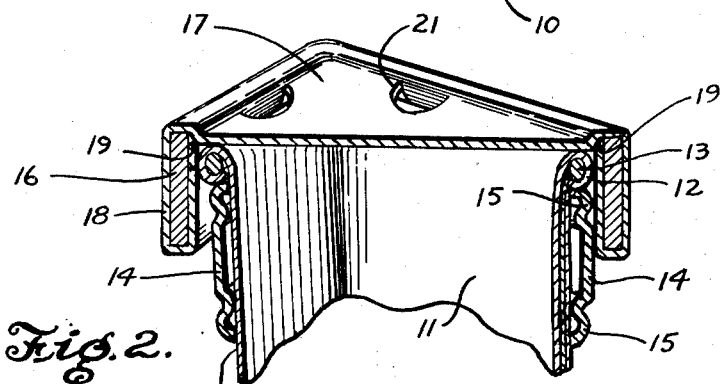
Fig. 2 is an enlarged fragmentary vertical section taken on line 2—2 of Fig. 1.
Figure 3:
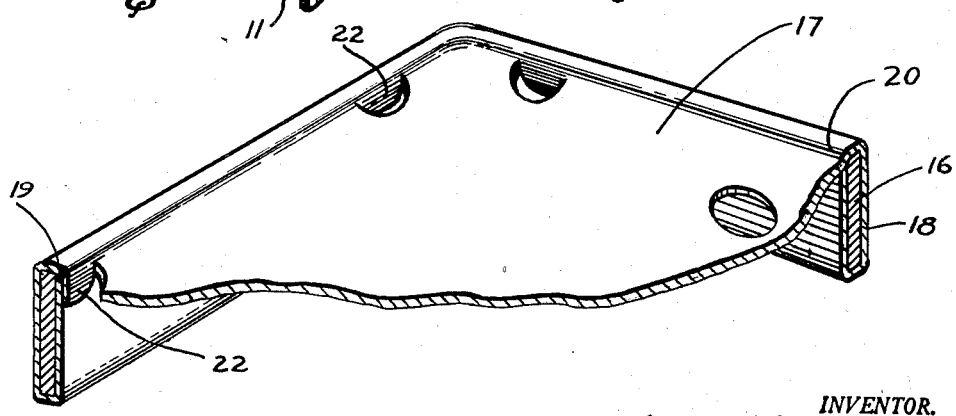
Fig. 3 is an enlarged fragmentary top perspective view of the bake pan cover to show details of its construction and assembly.

Fig. 1 of the drawings shows a multiple baking pan set of three pans secured together within a strapping frame, but it will be understood that when desired, a fewer or greater number of pans may be included in a set by increasing or decreasing the lengths of the sides of the strapping frame and that a multiple number of pans of various sizes may be accompanied by varying the size and material of the strapping frame. It is also to be understood that the present invention can be readily used in conjunction with a single pan as well as a pan set consisting of two or more pans.

Referring more particularly to the drawing, each of the pans shown includes a bottom wall 10 of rectangular plan surrounded by upstanding side walls 11. Encircling the walls 11 of each pan and crimped within the flange 12 formed at the upper edges of said walls 11 is a wire 13 which results in the creation of outstanding reinforcing bead and the upper periphery of each of the pans in the set. The pans are held together by any suitable means such as a strap 14 positioned along and against the exposed walls of the pans. The mounting, and to a large extent the construction, of the straps 14 and the cooperation thereof with the pans, have no particular bearing upon the present invention. However, in the form of strap 14 shown in the drawings, a bead 15 is formed along each longitudinal edge of each strap 14, the upper bead being positioned below the outstanding bead created by the flange 12 and wire 13 referred to above.

The cover construction contemplated by and forming the feature of the present invention includes a marginal frame member 16 consisting of a strip of metal bent into a shape adapted to conform with and loosely embrace the rectangular shape of the area defined by the upper edge of the strap 14 positioned along the exposed walls 10 of the pans. A separate top member 17 consisting of a single sheet of metal is provided with marginal portions 18 which are folded about the frame member 16 so as to position the free edge 19 of said marginal portions interiorly of the frame member 16. The body of the top member 17 located within said marginal portions 18 is preferably arranged in a plane offset downwardly with respect to the marginal portion 18 where the latter initially overlaps the frame member 17 so as to create a bevelled shoulder 20 about the periphery of said body portion of the top member 17. U-shaped incisions 21 are formed in the top member at spaced intervals peripherally of said bevelled shoulder 20 with the metal therewithin bent downwardly out of the plane of said body portion to provide locking ears 22 which overlap and engage with inwardly facing surfaces of said marginal portions 19 disposed interiorly of the frame member 17. These ears 22 accordingly lock the free edge 19 of the marginal portions 18 into tight engagement with the interior surface of the frame member 16 so as to create a rigid assembly of the top member 17 and the frame member 16 without the use of separate fastening means such as rivets, welding or the like.

The cover is preferably provided with a series of openings 22 in alignment with the space between adjoining pans for the purpose of assuring satisfactory circulation of heated air between the pans.

Minor changes, of course, may be made in the details of the construction and arrangement of parts without departing from the spirit of the invention as defined in appended claims.

What is claimed is:

1. A baking pan cover comprising a marginal metal frame member, a separate top member consisting of a single sheet of metal having its marginal portions folded about said frame member with the free edge of said marginal portions terminating interiorly of the frame, the body of the top member located within said marginal portion having incisions formed therein at spaced intervals about its periphery with the metal therewithin turned out of the plane of said body to provide ears which overlap and engage the inwardly facing surfaces of said marginal portions terminating interiorly of the frame member.

2. A baking pan cover as claimed in claim 1 wherein the body of the top member located within said marginal portion is arranged in a plane offset downwardly with respect to the marginal portion where the latter initially overlaps the frame member.

JACK KOLLMAN.

REFERENCES CITED

The following references are of record in the file of this patent:

UNITED STATES PATENTS

| Number | Name | Date |
|---|---|---|
| 2,188,550 | Jackson et al. | Jan. 30, 1940 |
| 2,257,468 | Langel | Sept. 30, 1941 |